United States Patent [19]
Knutson et al.

[11] Patent Number: 5,265,274
[45] Date of Patent: Nov. 23, 1993

[54] COMBINED KEYPAD AND SPEAKER PORTING

[75] Inventors: William J. Knutson, Orlando; Bernard V. Gasparaitis, Tamarac, both of Fla.

[73] Assignee: Motorola, Inc., Schaumburg, Ill.

[21] Appl. No.: 939,409

[22] Filed: Sep. 1, 1992

Related U.S. Application Data

[63] Continuation of Ser. No. 532,726, Jun. 4, 1990, abandoned.

[51] Int. Cl.$^5$ .............................................. H04B 1/08
[52] U.S. Cl. ...................................... 455/347; 455/350
[58] Field of Search ................. 455/347, 350, 90, 156; 381/188, 152, 205; 379/368, 388, 420; 200/5 A

[56] References Cited

U.S. PATENT DOCUMENTS

| | | | |
|---|---|---|---|
| 4,081,631 | 3/1978 | Feder | 200/5 A |
| 4,225,970 | 9/1989 | Jaramillo et al. | 455/89 |
| 4,719,322 | 1/1988 | Guzik et al. | 200/5 A |
| 4,832,150 | 5/1989 | Just et al. | 181/175 |
| 4,963,876 | 10/1990 | Sanders et al. | 455/90 |

Primary Examiner—Reinhard J. Eisenzopf
Assistant Examiner—Christine K. Belzer
Attorney, Agent, or Firm—Juliana Agon

[57] ABSTRACT

A combined keypad and speaker portion (10) is provided wherein a membrane keypad (26) having a plurality of keys (28) has a plurality of speaker sound perforations (38) interposed between the plurality of keys (28).

14 Claims, 2 Drawing Sheets

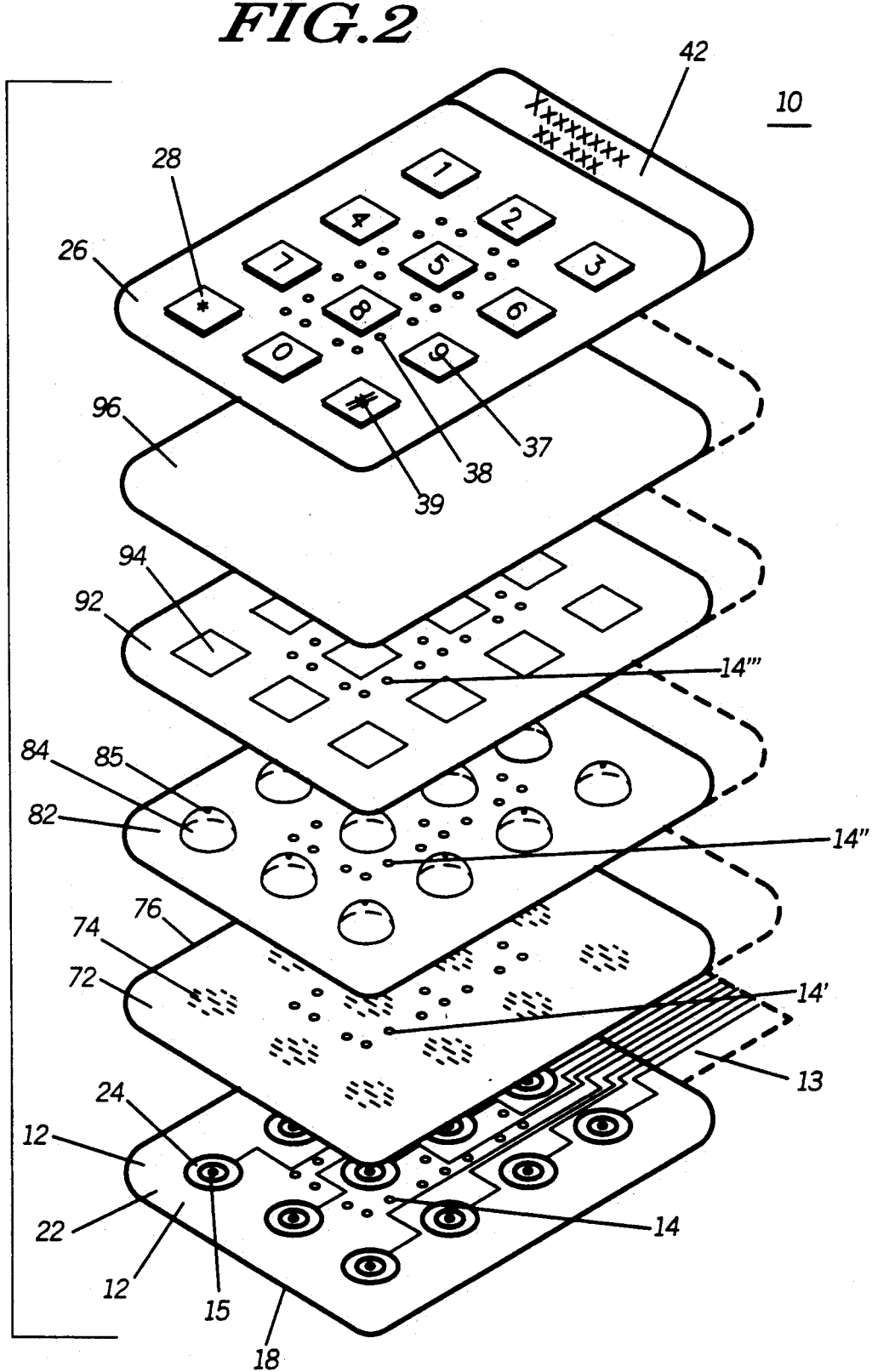

COMBINED KEYPAD AND SPEAKER PORTING

This is a continuation of application Ser. No. 07/532,726, filed Jun. 4, 1990 and now abandoned.

TECHNICAL FIELD

This invention relates generally to the field of speaker porting and keypads and more particularly to assemblies of key pads and speaker porting that find application in portable radio transceivers.

BACKGROUND ART

In portable transceivers such as radios, it is desirable to be able to add functions without increasing the size of the unit. One important addition may be a display on a front cover. However, a space problem arises when attempting to include a display in a portable transceiver already including a keypad and a speaker grille all on the same front cover. Hence, a need exists to maximize efficient space usage in a portable transceiver. The maximum degree of weather and contamination protection is also a requirement in such portable equipment.

SUMMARY OF THE INVENTION

Accordingly, it is an object of the present invention to provide combined speaker porting and keypad functions in a radio assembly.

Briefly, according to the invention, a combined keypad and speaker portion comprises a membrane keypad having a plurality of keys with a plurality of speaker sound perforations interposed between the plurality of keys.

BRIEF DESCRIPTION OF THE DRAWINGS

FIG. 2 is an exploded top perspective view of a keypad and speaker porting assembly in accordance with the present invention.

DETAILED DESCRIPTION OF THE PREFERRED EMBODIMENT

Figure 1:
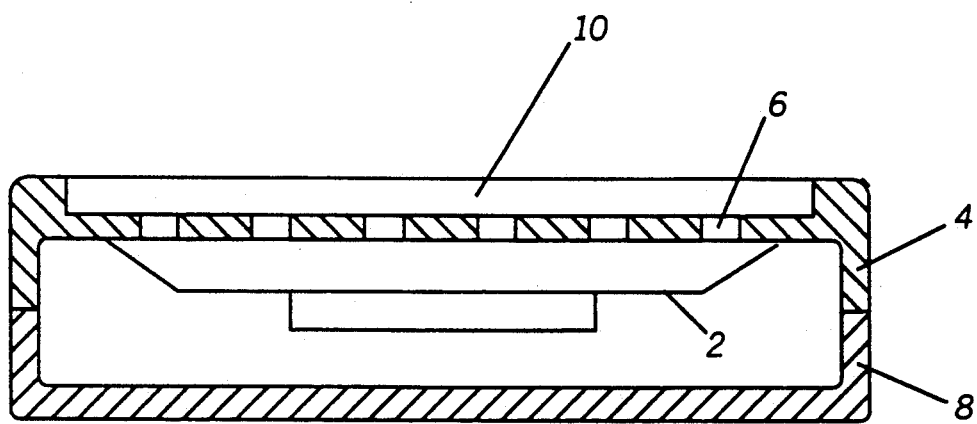
FIG. 1 is a side perspective view of a keypad and speaker porting assembly in a radio in accordance with the present invention.

Referring to FIG. 1, for assembly into a radio of the present invention, a front cover 4 attachable to a radio housing 8 may be recessed for receiving the assembled keypad and speaker porting unit 10. The recessed portion of a front cover 4 located on top of a speaker 2 would have a speaker grille 6 incorporated therein. Conductive hot melt tab techniques may be used to electrically interconnect the keypad and speaker porting assembly 10 to the rest of the radio.

Referring to FIG. 2, a speaker porting and keypad assembly 10 according to the present invention is shown. This multi-purpose keypad system 10 is molded, formed and/or perforated from multiple layers of laminated membrane or film. A radio keypad circuit layer 12 with an interconnect tail section 13 has a plurality of speaker sound perforations or ports 14 perforated though the layer. The front side of the speaker 2 covered by the speaker grille 6 is disposed behind a back side 18 of the keypad circuit layer 12 for porting sound through the sound perforations 14. The front side 22 of the keypad circuit layer 12 has a plurality of switches 24 being interposed by the speaker sound perforations 14. Represented by circles, the switches 24 can be conventional interdigitated fingers as is well known in the keypad art or be actual concentric circles that connect with the interconnect section 13, upon contact with an inner conductor 15, to form an electronic circuit for the keypad assembly 10. The bottom side of this keypad circuit layer 12 may also act as a component carrier for carrying components such as light-emitting diodes (LED's).

A contact layer 72 is attached with adhesive, and laminated on top of the keypad circuit layer 12. The adhesive further serves as a spacer to provide an air gap between the contact layer 72 and the circuit layer 12 when contact is not made. This contact layer 72 has a plurality of conductive pads 74 (which may be fine conductive lines silk screened) on the bottom side 76 of the contact layer 72 to selectively close the switches 24 upon contact of the conductive pads 74 with the inner conductor 15 and concentric circles of the switches 24. In addition, the contact layer 72 also includes a plurality of speaker sound perforations 14' interposed between the plurality of conductive pads 74 and are in alignment with the speaker sound perforations 14 of the circuit layer 12 below.

On top of the contact layer 72, an actuator layer 82 has a plurality of actuators 84 for selectively depressing the bottom conductive pad 74 upon pressure exerted by the desired actuator 84. As is known in the art, the actuators 74 may be spherical shaped domes, often called Poplers which pop under contact pressure. Similar to the layer below, the actuator layer 82 also includes a plurality of speaker sound perforations 14'' interposed between the plurality of actuators 84 and in alignment with the speaker sound perforations 14' below. Furthermore, a sound port opening 85 may be formed at the center of the domes 84 to reduce air-lock and provide additional openings for the sound waves.

A spacer layer 92 is attached with adhesive and laminated on top of the bottom actuator layer 82 to provide a substantially flat surface when the actuators 84 protrude through a plurality of apertures 94. This spacer layer 92 may be acrylic molded to form the apertures 94 which may be squared to fit around the round Pople domes 84. In alignment with the speaker sound perforations 14'' below, the spacer layer 92 has a plurality of speaker sound perforations 14''' interposed between the plurality of apertures. By this structure, the spacer layer 92 controls the depression distance of the domes 84 while allowing sound waves to flow through the sound perforations or ports 14'''.

A water seal or membrane layer 96 is disposed on top of the spacer layer 92 to protect against water intrusion and other contamination such as dust through the sound perforations (14, 14', 14'', and 14''') below.

Finally, a membrane keypad 26 having a plurality of stepped-up keys 28 with a plurality of speaker sound ports 38 interposed between the plurality of keys and in alignment with the speaker perforations below (14, 14', 14'', and 14'''), is attached with adhesive and laminated on top of the layer below. Upon being pressed by an operator, the keys 28 selectively engage the actuators 84 on the top surface of the contact layer 82 to exert enough downward pressure upon the conductive pads 74 to close the keypad switches 24.

Optionally, the water seal layer 96 could be eliminated if the plurality of speaker sound ports 38 can be controllably molded with a very thin back wall that is permeable for sound, but still protects against water intrusion sufficiently by itself. If so, the keypad layer 26 may be formed with recessed sound ports that does not penetrate the thin wall.

As a further variation, multi-colored nomenclature 37 and artwork 39 may be silk-screened on the backside of an optically clear silicone keypad layer 26. Phosphorescent pigment may be silk-screened on the backside of the keypad layer 26 to provide a lighted keypad (upon activation by LED's). Consequently, the spacer layer 92 (as well as other layers) may also be optically clear to serve as part of a light guide where light waves in the spacer layer 92 will energize the phosphorescent pigment to light-up the keypad layer 26.

Another option could be to extend all the layers to accommodate a product name plate 42 which may be incorporated as part of the keypad layer 26. In this way, several keypads with their associated model name changes can be simply interchanged to create or customize different product models.

In summary, the keypad 26 with the plurality of keys 28 is laminated on the top side 22 of the keypad circuit layer 12. When assembled, the individual keys 28 are engagable with connecting conductive pads 74 and switches 24 in the conventional manner. As with all the other layers, keypad 26 and keys 28 may be integrally formed from a thin film polymer material such as silicone. However, other suitable material may be used for rubber molding the keys 28 integral with the keypad 26 as a membrane. With the speaker behind the keypad and speaker porting assembly 10, all the speaker perforations or speaker ports (38, 14''', 14'', 14', and 14) are substantially in alignment for direct sound porting. In other words, the sound ports are lined-up in all the layers. As an integral unit, the present invention eliminates the part of the conventional front cover which has apertures for receiving the keys 28 that is located away from a speaker grille.

Upon assembly, the present invention provides efficient space usage and environmental protection. Since the individual keys 28 are not placed in a conventional rectangular matrix away from a conventional speaker grille, but instead is formed integral and interposed with speaker ports 38, maximum space usage is achieved. Optionally, this assembly may incorporate several independent details and operations of radio communication equipment such as a product name plate and a self-lighted and self-fastened keypad having sound ports, electronic circuitry, and other components.

What is claimed is:

1. A radio comprising:
   a radio front housing cover having an integral speaker grille, a front side and a back side, said speaker grille integrally formed between said front and back sides, said front side having a recessed portion;
   a speaker disposed on said back side; and
   a single unit of multiple laminated membrane layers including a membrane switch assembly having dome-like bridging elements, a membrane keypad, and means for waterproofing said single unit, said single unit captivated in said recessed portion, said membrane keypad having a plurality of keys with a pattern of speaker sound perforations interposed among said plurality of keys for substantially direct sound porting of said speaker disposed behind said plurality of keys.

2. The radio of claim 1, wherein said keypad and keys are formed of a thin film polymer material.

3. The radio of claim 2, wherein said membrane keypad and keys are integrally silicone rubber molded for bonding flush with said radio front housing.

4. The radio of claim 1, wherein said means for waterproofing comprises a thin back membrane wall, permeable to sound, to protect against water intrusion, molded in back of said plurality of speaker sound perforations.

5. The radio of claim 1, wherein said means for waterproofing comprises a water seal film disposed behind said membrane keypad to protect against water intrusion.

6. The radio of claim 1, wherein said single unit comprises an actuator layer having said dome-like bridging elements for engaging by said keys and said pattern of speaker sound perforations interposed among said dome-like bridging elements, whereby said pattern of speaker sound perforations on said actuator layer is substantially in alignment with said pattern of speaker sound perforations on said membrane keypad.

7. The radio of claim 6 wherein said single unit comprises a spacer layer disposed between said membrane keypad and said actuator layer, said spacer layer having said pattern of speaker sound perforations and apertures for receiving said dome-like bridging elements.

8. A radio having a combined keypad and speaker porting for allowing sound transmission from a speaker, said radio comprising:
   a radio front housing cover having an integral speaker grille, a front side and a rear side, said speaker grille integrally formed between said front and rear sides, said front side having a recessed portion;
   said speaker disposed on said rear side behind said radio front cover; and
   a single waterproof unit of multiple laminated membrane layers including a membrane switch assembly, a membrane keypad, and means for waterproofing said single unit, said single unit captivated in said recessed portion, in front of said radio front housing cover, said membrane keypad having a plurality of keys with a plurality of speaker sound ports interposed among said plurality of keys for substantially direct sound porting of said speaker disposed behind said plurality of keys; and
   said membrane switch assembly including an actuator layer having a plurality of dome-like bridging elements for engagement by said plurality of keys and said plurality of speaker sound ports interposed among said plurality of dome-like bridging elements, whereby said plurality of speaker sound ports on said actuator layer is substantially in alignment with said plurality of speaker sound ports on said membrane keypad.

9. A radio, having combined keypad and speaker porting, comprising:
   a radio front housing cover having a first side, a second side, and a plurality of speaker sound perforations formed between said first and second sides, said first side having a recessed portion;
   a speaker disposed on said second side; and
   a single unit of multiple laminated membrane layers including a membrane switch assembly and a membrane keypad, said single unit captivated flush with said radio front housing such that a separate keypad cover is not needed, said membrane keypad having a plurality of keys with a plurality of speaker sound ports interposed among said plurality of keys;

said membrane switch assembly comprises:

a water seal layer disposed behind said membrane keypad to protect against water intrusion;

an actuator layer having a plurality of actuators for selectively engaging by said keys and a plurality of speaker sound perforations, interposed among said plurality of actuators, said speaker sound perforations in alignment with said plurality of said speaker sound ports, wherein said actuators comprise dome-like bridging elements;

a spacer layer disposed between said membrane keypad and said actuator layer having a plurality of apertures for receiving said plurality of actuators and having a plurality of speaker sound perforations interposed among said plurality of apertures, said speaker sound perforations in alignment with said plurality of said speaker sound ports;

a contact layer disposed behind said actuator layer having a plurality of conductive pads on a first side of said contact layer for selectively contacting said plurality of actuators on a second side of said contact layer and having a plurality of speaker sound perforations interposed among said plurality of conductive pads, said speaker sound perforations in alignment with said plurality of said speaker sound ports; and a radio keypad circuit layer disposed behind said contact layer having a plurality of switches to be selectively closed by said plurality of conductive pads and having a plurality of speaker sound perforations interposed among said plurality of switches, said speaker sound perforations in alignment with said plurality of said speaker sound ports.

10. The radio having the combined keypad and speaker porting of claim 9, wherein said membrane keypad and all the layers are formed of laminated films.

11. The radio having the combined keypad and speaker porting of claim 9, wherein said plurality of speaker sound perforations of said radio front housing cover comprises a recessed speaker grille.

12. The radio having the combined keypad and speaker porting of claim 9, wherein at least one of said dome-like bridging elements includes a sound port opening.

13. The radio having the combined keypad and speaker porting of claim 9, wherein at least one of said dome-like bridging elements includes a sound port opening at the center of at least one of said dome-like bridging elements.

14. The radio having the combined keypad and speaker porting of claim 9, wherein said membrane keypad and all the layers are extended to form an integral radio product name plate.

* * * * *